United States Patent
Lomprey et al.

(10) Patent No.: US 6,433,914 B1
(45) Date of Patent: Aug. 13, 2002

(54) COLOR-STABILIZED ELECTROCHROMIC DEVICES

(75) Inventors: Jeffrey R. Lomprey; Thomas F. Guarr; Kelvin L. Baumann, all of Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/650,870

(22) Filed: Aug. 30, 2000

Related U.S. Application Data

(63) Continuation-in-part of application No. 09/377,455, filed on Aug. 19, 1999, now Pat. No. 6,188,505.

(51) Int. Cl.[7] .............................. G02F 1/15; G02F 1/153; F21V 9/00
(52) U.S. Cl. ........................ 359/265; 359/271; 359/237; 252/582
(58) Field of Search ................................ 359/265, 270, 359/271, 273, 237, 245; 252/582, 588

(56) References Cited

U.S. PATENT DOCUMENTS

| | | | |
|---|---|---|---|
| 4,933,394 A | * | 6/1990 | Foos ........................... 525/326 |
| 5,724,187 A | | 3/1998 | Varaprasad et al. ......... 359/608 |
| 5,910,854 A | | 6/1999 | Varaprasad et al. ......... 354/273 |
| 5,998,617 A | | 12/1999 | Srinivase et al. ........... 544/347 |
| 6,001,487 A | * | 12/1999 | Ladang et al. .............. 428/432 |
| 6,195,192 B1 | * | 2/2001 | Baumann et al. ........... 359/265 |
| 2001/0022357 A1 | * | 9/2001 | Desaraju et al. ............ 252/583 |

FOREIGN PATENT DOCUMENTS

SU 830456 A1 2/1993

* cited by examiner

Primary Examiner—Georgia Epps
Assistant Examiner—Tim Thompson
(74) Attorney, Agent, or Firm—King & Jovanovic, PLC; Brian J. Rees

(57) ABSTRACT

An electrochromic device comprising: (a) at least one substantially transparent substrate having an electrically conductive material associated therewith; and (b) an electrochromic medium having a predetermined color while in a high transmission state, wherein the electrochromic medium comprises: (1) an anodic material and a cathodic material, wherein both of the anodic and cathodic materials are electroactive and at least one of the anodic and cathodic materials is electrochromic; (2) a redox buffer; and (3) means associated with the redox buffer for controllably maintaining the predetermined color of the electrochromic medium while in the high transmission state relative to an electrochromic medium without the redox buffer.

34 Claims, 5 Drawing Sheets

COLOR-STABILIZED ELECTROCHROMIC DEVICES

CROSS-REFERENCE TO RELATED APPLICATION(S)

This application is a continuation-in-part of U.S. application Ser. No. 09/377,455, U.S. Pat. No. 6,188,505 filed Aug. 19, 1999.

BACKGROUND OF THE INVENTION

1. Field of the Invention

The present invention relates in general to electrochromic devices, and more particularly, to normally operating, color-stabilized electrochromic devices having an electrochromic medium comprising one or more redox buffers, which serve to substantially preclude the formation of undesirable residual color within the electrochromic medium while in its high transmission state.

2. Background Art

Electrochromic devices have been known in the art for several years. While the utilization of electrochromic devices, such as electrochromic mirrors, has become increasingly popular among, for example, the automotive industry, the development of undesirable residual color within the electrochromic medium of such electrochromic devices remains problematic.

Indeed, when a sufficient electrical potential difference is applied across the electrodes of a conventional electrochromic device, the electrochromic medium becomes intentionally colored (i.e. a low transmission state) inasmuch as one or more of the anodic and the cathodic materials are oxidized and reduced, respectively. Specifically, the anodic materials are oxidized by donating one or more electron(s) to the anode and the cathodic materials are reduced by accepting one or more electron(s) from the cathode.

For most commercially available electrochromic devices, when the electrical potential difference is removed or substantially diminished, the anodic and/or cathodic materials return to their zero-potential or unactivated state, and in turn, return the electrochromic medium to a predetermined state, which is conventionally colorless, nearly colorless, or intentionally tinted (i.e. a high transmission state). The application and removal of an electrical potential difference is conventionally known as a single cycle of the electrochromic device.

Scientists have observed that over a period of cycles and/or time, during normal operation of the electrochromic device, the electrochromic medium sometimes does not acceptably return to a predetermined state. In some instances, even in the absence of an electrical potential difference, a portion of the anodic and cathodic materials may be oxidized or reduced respectively, thereby forming residual color from the oxidized and/or reduced materials. The residual oxidized anodic materials or the residual reduced cathodic materials of the electrochromic medium can result in an undesired residual coloration of the electrochromic medium.

Factors that are believed to facilitate the formation of the undesired residual oxidized anodic and/or reduced cathodic materials include, among other things, thermal and/or photochemical decomposition of one or more of the medium materials, and/or the permeation of water and/or oxygen into the electrochromic medium.

It is therefore an object of the present invention to provide an electrochromic medium with one or more redox buffers which remedy the aforementioned detriments and/or complications associated with controllably maintaining a predetermined color of an electrochromic medium (i.e. colorless, nearly colorless, or intentionally tinted) while in a high transmission state relative to an electrochromic medium without the redox buffer.

SUMMARY OF THE INVENTION

The present invention is directed to the use of one or more redox buffers in an electrochromic medium. To act as a redox buffer, a material will exhibit an electrochemical reaction within a range bounded by the first oxidation potential of the principal anodic material, typically the anodic electrochromic material, and the first reduction potential of the principal cathodic material, typically the cathodic electrochromic material. The material may exhibit the electrochemical reaction initially, or alternatively may generate a species that exhibits the electrochemical reaction after a chemical reaction that follows oxidation or reduction. In this case, the redox potential corresponding to the oxidation or reduction process may lie outside of the above-identified range.

The present invention is also directed to an electrochromic device comprising: (a) at least one substantially transparent substrate having an electrically conductive material associated therewith; and (b) an electrochromic medium having a predetermined color while in a high transmission state, wherein the electrochromic medium comprises: (1) an anodic material and a cathodic material, wherein both of the anodic and cathodic materials are electroactive and at least one of the anodic and cathodic materials is electrochromic; (2) a redox buffer; and (3) means associated with the redox buffer for controllably maintaining the predetermined color of the electrochromic medium while in the high transmission state relative to an electrochromic medium without the redox buffer.

BRIEF DESCRIPTION OF THE DRAWINGS

The invention will now be described with reference to the drawings wherein.

DETAILED DESCRIPTION OF THE INVENTION

Figure 1:
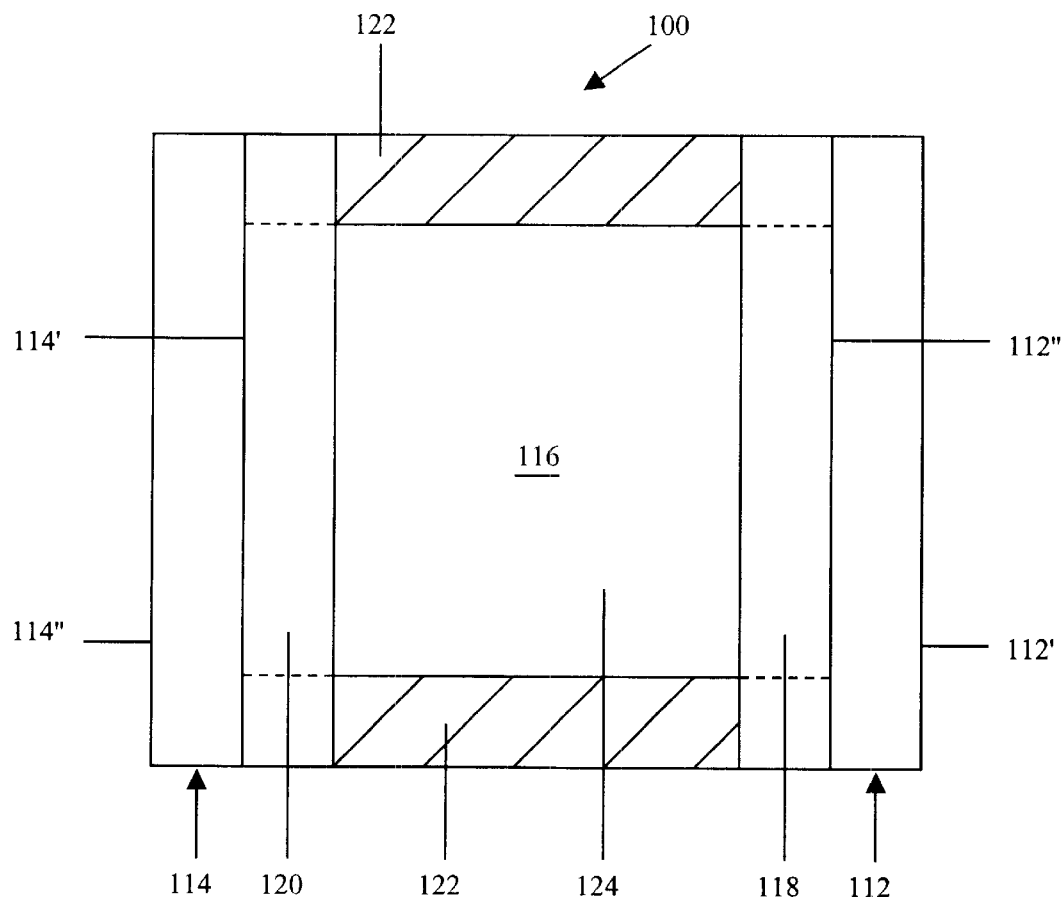
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having a front surface 112A and a rear surface 112B, second substrate 114 having a front surface 114A and a rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector" and U.S. application Ser. No. 09/343,345 entitled "Electrode Design For Electrochromic Devices," both of which are incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength to be able to operate effectively in conditions of intended use. Indeed, electrochromic devices in accordance with the present invention can be, during normal operation, exposed to extreme temperatures as well as substantial UV radiation, emanating primarily from the sun.

Second substrate 114 can be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium-doped tin oxide (ITO), doped zinc oxide or other materials known in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electronically conductive material 120 may vary depending upon the intended use of the electrochromic device. For example, if the electrochromic device is a mirror, then the material may comprise a transparent conductive coating similar to electronically conductive material 118 (in which case a reflector is associated with rear surface 114B of second substrate 114). Alternatively, electrically conductive material 120 may comprise a layer of reflective material in accordance with the teachings of U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof. Sealing member 122 may comprise any material that is capable of being adhesively bonded to the electronically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos.: 4,297,401; 4,418,102; 4,695,490; 5,596,023; 5,596,024; 4,297,401; and U.S. patent application Ser. No. 09/158,423 entitled "Improved Seal For Electrochromic Devices," all of which are herein incorporated by reference.

For purposes of the present disclosure, electrochromic medium 124 includes, among other materials, electroactive anodic and cathodic materials that upon activation, due to the application of an electronic voltage or potential, exhibit a change in absorbance at one or more wavelengths of the electromagnetic spectrum. The medium is preferably chosen from the following categories:

(i) Single Layer-single Phase:

The electrochromic medium may comprise a single layer of material which may include small nonhomogenius regions and includes solution phase devices where a material contained in solution in the ionically conducting electrolyte which remains in solution in the electrolyte when electrochemically oxidized or reduced. Solution phase electroactive materials may be contained in the continuous solution phase of a free standing rigid matrix in accordance with the teachings of U.S. patent application Ser. No. 08/616,967, entitled "Improved Electrochromic Layer And Devices Comprising Same" and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are incorporated herein by reference in their entirety.

More than one anodic and cathodic material can be combined to give a pre-selected color as described in U.S. Pat. No. 6,020,987 entitled "Improved Electrochromic Medium Capable of Producing A Pre-Selected Color," which is incorporated herein by reference in its entirety.

The anodic and cathodic materials can be combined or linked by a bridging unit as described in International Application Ser. No. PCT/WO97/30134 entitled "Electrochromic System," which is incorporated herein by reference in its entirety.

It is also possible to link anodic materials or cathodic materials by similar methods. The concepts described in these applications can further be combined to yield a variety of electroactive materials that are linked, including linking of a redox buffer to an anodic and/or cathodic material.

Additionally a single layer-single phase medium may include a medium where the anodic and cathodic materials are incorporated into a polymer matrix as is described in International Application Serial No. PCT/WO99/02621 entitled "Electrochromic Polymer System" and International Patent Application Serial No. PCT/US98/05570 entitled "Electrochromic Polymeric Solid Films, Manufacturing Electrochromic Devices Using Such Solid Films, And Processes For Making Such Solid Films And Devices".

(ii) Multilayer—the medium may be made up in layers and includes a material attached directly to an electronically conducting electrode or confined in close proximity thereto which remains attached or confined when electrochemically oxidized or reduced. Examples of this type of electrochromic medium include a $WO_3$/ionically conducting layer/counter layer electrochromic medium. An organic or organometallic layer attached to the electrode may also be included in this type.

(iii) Multiphase—one or more materials in the medium undergoes a change in phase during the operation of the device, for example a material contained in solution in the ionically conducting electrolyte forms a layer on the electronically conducting electrode when electrochemically oxidized or reduced.

The cathodic material may include, for example, viologens, such as methyl viologen tetrafluoroborate or octyl viologen tetrafluoroborate ($E1_{1/2}$–300 mV vs. the $E1_{1/2}$ peak of 5,10-dihydro-5,10-dimethylphenazine (hereinafter "DMP") at +300 mV), 1,1',3,3'-tetramethyl-4,4'-bipyridinium tetrafluoroborate ($E1_{1/2}$–700 mV vs. DMP). It will be understood that the preparation and/or commercial availability for each of the above-identified cathodic materials is well known in the art. While specific cathodic materials have been provided, for illustrative purposes only, numerous other conventional cathodic materials are likewise contemplated for use including, but by no means limited to, those disclosed in U.S. Pat. No. 4,902,108, which is hereby incorporated in its entirety by reference. Indeed, the only contemplated limitation relative to the cathodic material is that it should not adversely affect the electrochromic performance of the device 100. Moreover, it is contemplated that the cathodic material may comprise a solid transition metal oxide, including, but not limited to, tungsten oxide.

The anodic material may comprise any one of a number of materials including ferrocene ($E1_{1/2}$ +524 mV vs. DMP), substituted ferrocenes, substituted ferrocenyl salts, substituted phenazines, phenothiazine ($E1_{1/2}$ +700 mV vs. DMP), substituted phenothiazines, thianthrene, substituted thianthrenes. Examples of anodic materials may include di-tert-butyl-diethylferrocene, (6-(tetra-tert-butylferrocenyl)hexyl)triethylammonium tetrafluoroborate ($E1_{1/2}$ +260 mV vs. DMP), (3-(tetra-tert-butylferrocenyl)propyl)triethylammonium tetrafluoroborate ($E1_{1/2}$ +372 mV vs. DMP), DMP ($E1_{1/2}$ +300 mV as the reference), 3,7,10-trimethylphenothiazine, 2,3,7,8-tetramethoxythianthrene ($E1_{1/2}$ +748 vs. DMP), and 10-methylphenothiazine ($E1_{1/2}$ +880 mV vs. DMP). It will be understood that numerous other anodic materials are contemplated for use including those disclosed in the previously referenced and incorporated '108 patent as well as U.S. application Ser. No. 09/377,455 entitled "Color-Stabilized Electrochromic Devices", which is incorporated herein by reference in its entirety.

For illustrative purposes only, the concentration of the anodic and cathodic materials can range from approximately 1 mM to approximately 500 mM and more preferably from approximately 5 mM to approximately 50 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of electrochromic medium 124 may comprise any one of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitriles, such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed as being associated with the electrochromic medium, numerous other solvents that would be known to those having ordinary skill in the art having the present disclosure before them are likewise contemplated for use.

In accordance with the present invention, one or more redox buffers are associated with electrochromic medium 124, which controllably maintain the predetermined color of the electrochromic medium while in the high transmission state relative to an electrochromic medium without the redox buffer. The term "high transmission state" is defined as the bleached state, the zero-potential state, or the unactivated state of the electrochromic device.

In a first embodiment of the present invention, the redox buffer may comprise one or more materials represented by formulae I-A and/or I-B:

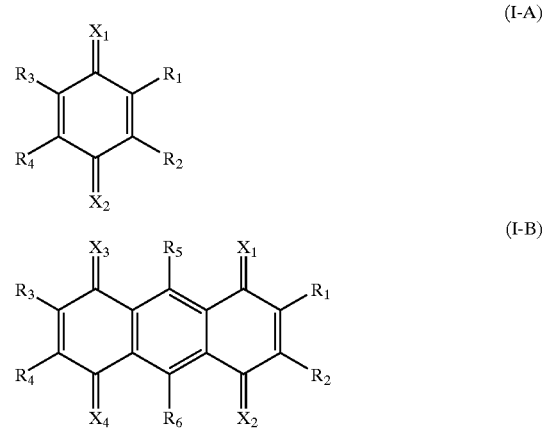

wherein $X_1$–$X_4$ are the same or different and comprise O, $C(CN)_2$, S, $N(R_7)$, or $N^+(R_7)(R_8)$; wherein $R_1$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; and wherein $R_1$–$R_2$, $R_3$–$R_4$, and/or $R_7$–$R_8$ may be associated with a substituted or unsubstituted benzo group, a closed ring, or form a partially saturated ring.

The redox buffer may also comprise one or more materials represented by formulae II:

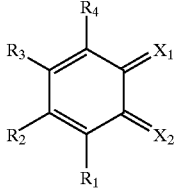

(II)

wherein $X_1$–$X_2$ are the same or different and comprise O, $C(CN)_2$, S, $N(R_7)$, or $N^+(R_7)(R_8)$; wherein $R_1$–$R_4$ and $R_7$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; and wherein $R_1$–$R_2$, $R_2$–$R_3$, $R_3$–$R_4$, and/or $R_7$–$R_8$ may be associated with a substituted or unsubstituted benzo group, a closed ring.

More specifically, in this embodiment of the invention, the redox buffer may comprise quinone, substituted quinones and/or mixtures of the same. For example, the redox buffer may be represented by at least one of the formulae:

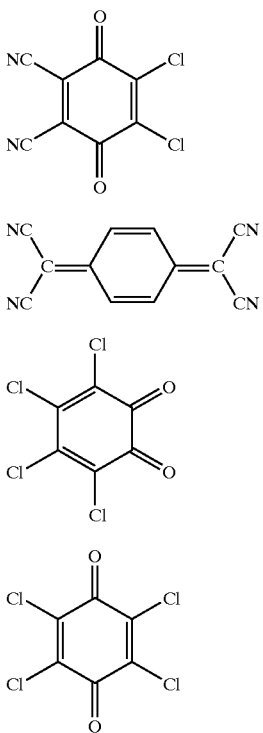

(1)

(2)

(3)

(4)

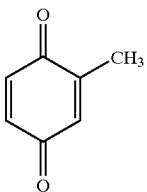

(5)

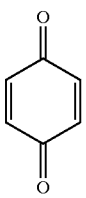

(6)

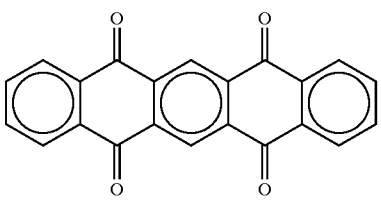

(7)

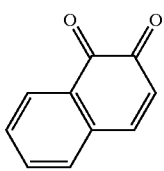

(8)

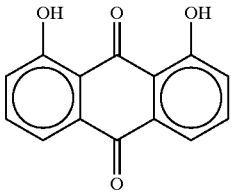

(9)

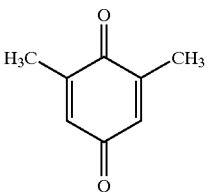

(10)

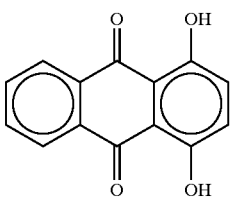

(11)

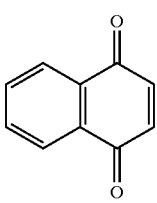

(12)

(13)
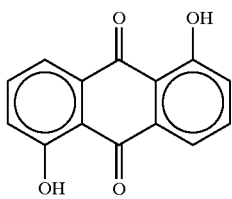

(14)
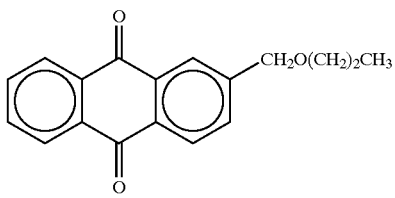

(15)
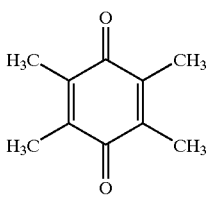

(16)
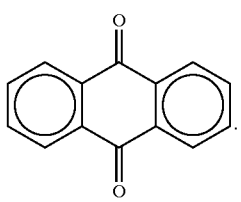

Table 1 below provides redox potentials as well as CAS numbers for many of above-identifed redox buffers 1–16.

TABLE 1

| Redox Buffer | E1* (mV) | CAS # | Redox Buffer | E1* (mV) | CAS # |
|---|---|---|---|---|---|
| 1 | +572 | 84-58-2 | 9 | −400 | 117-10-2 |
| 2 | +360 | 1518-16-7 | 10 | −472 | 527-61-7 |
| 3 | +284 | 2435-53-2 | 11 | −472 | 81-64-1 |
| 4 | +188 | 118-75-2 | 12 | −480 | N/A |
| 5 | −268 | 553-97-9 | 13 | −528 | 117-12-4 |
| 6 | −292 | 106-51-4 | 14 | −592 | N/A |
| 7 | −328 | N/A | 15 | −640 | 527-17-3 |
| 8 | −352 | 524-42-5 | 16 | −712 | 84-65-1 |

*wherein E1 is the average of the anodic and cathodic peak potentials.

will be understood that the above-identified quinones are merely illustrative of suitable quinones for use in accordance with the present invention, and that numerous other quinones which are compatible with the remainder of the electrochromic device are likewise contemplated for use.

In a second embodiment of the present invention, the redox buffer may comprise a material represented by formula III-A:

(III-A)
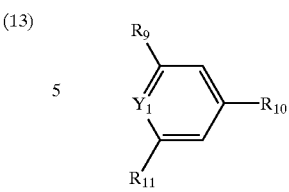

wherein $Y_1$ comprises $O^+$, $N^+(R_{12})$, or $S^+$; wherein $R_9$ and $R_{11}$–$R_{12}$ are the same or different and comprise H, a halide, a hydroxy group, a cyano group, a substituted or unsubstituted alkyl, aryl, alkaryl, aralkyl, or alkoxy group containing approximately 1 to approximately 12 carbon atoms, or $CF_3$; wherein $R_{10}$ comprises H, a halide, a hydroxy group, a cyano group, a substituted or unsubstituted alkyl, aryl, alkaryl, aralkyl, or alkoxy group containing approximately 1 to approximately 12 carbon atoms, $CF_3$, or (III-B)
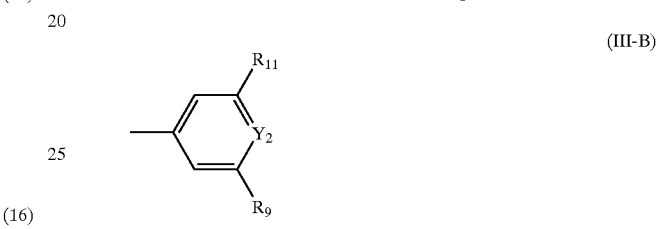

wherein $Y_2$ comprises $O^+$, $N^+(R_{12})$, or $S^+$.

In this embodiment, the redox buffer may comprise pyrylium salt, substituted pyrylium salts, bipyrylium salt, substituted bipyrylium salts, and mixtures thereof. For example, the redox buffer may be represented by at least one of the formulae:

(17)

(18)
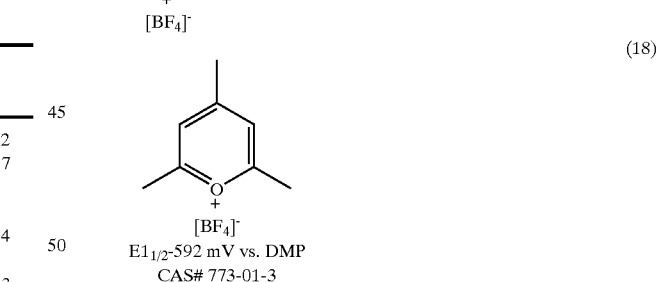

$E1_{1/2}$-592 mV vs. DMP
CAS# 773-01-3

(19)
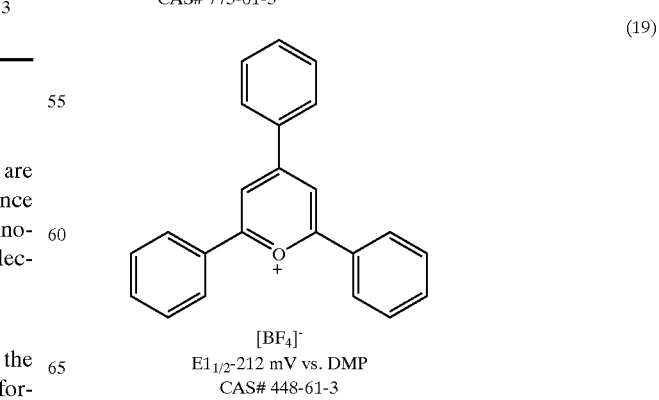

$E1_{1/2}$-212 mV vs. DMP
CAS# 448-61-3

-continued

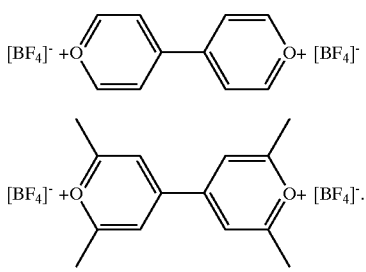

(20)

(21)

It will be understood that the above-identified pyrylium salts are merely illustrative of suitable pyrylium species for use in accordance with the present invention, and that numerous other pyrylium salts which are compatible with the remainder of the electrochromic device are likewise contemplated for use.

In a third embodiment, the redox buffer may comprise a material represented by formula IV-A and/or IV-B:

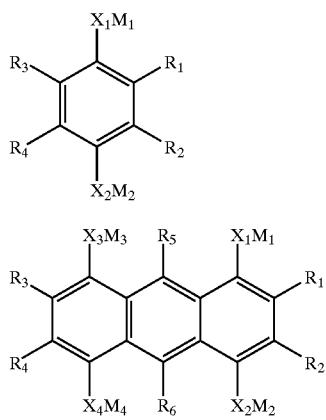

(IV-A)

(IV-B)

wherein $X_1$–$X_4$ are the same or different and comprise O, $C(CN)_2$, S, $N(R_7)$, or $N^+(R_7)(R_8)$; wherein $R_1$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; wherein $R_1$–$R_2$, $R_3$—$R_4$, and/or $R_7$–$R_8$ may be associated with a substituted or unsubstituted benzo group, a closed ring, or form a partially saturated ring; and wherein $M_1$–$M_4$ are the same or different and comprise $H^+$, $Li^+$, $Na^-$, $K^+$, $N^+R_4$, $½Be^{2+}$, $½Mg^{2+}$, $½Ca^{2+}$, $½Sr^{2+}$, etc.

The redox buffer may comprise one or more materials represented by formulae V:

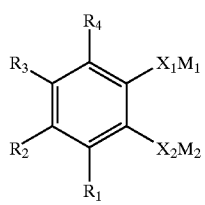

(V)

wherein $X_1$–$X_2$ are the same or different and comprise O, $C(CN)_2$, S, $N(R_7)$, or $N^+(R_7)(R_8)$; wherein $R_1$–$R_4$ and $R_7$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; wherein $R_1$–$R_2$, $R_2$–$R_3$, $R_3$–$R_4$ and/or $R_7$–$R_8$ may be associated with a substituted or unsubstituted benzo group, a closed ring, or form a partially saturated ring; and wherein $M_1$–$M_2$ are the same or different and comprise $H^{30}$, $Li^{30}$, $Na^{30}$, $K^{30}$, $NR_4^+$, $½Be^{2+}$, $½Mg^{2+}$, $½Ca^{2+}$, $½Sr^{2+}$, etc. More specifically, in this third embodiment the redox buffer may comprise hydroquinone, substituted hydroquinones, and mixtures thereof. For example, the redox buffer may be represented by at least one of the formulae:

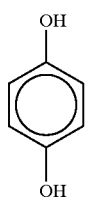

(22)

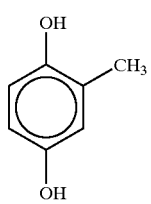

(23)

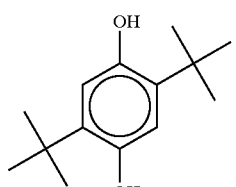

(24)

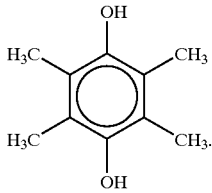

(25)

Table 2 below provides redox potentials as well as CAS numbers for many of fied redox buffers 22–25.

TABLE 2

| Redox Buffer | $E_p$* (mV) | CAS # | Redox Buffer | $E_p$. (mV) | CAS # |
|---|---|---|---|---|---|
| 22 | N/A | N/A | 24 | +1,064 | 88-58-4 |
| 23 | +1,116 | 95-71-6 | 25 | +984 | N/A |

*wherein $E_p$ is the anodic peak potential.

It will be understood that the above-identified hydroquinones are merely illustrative of suitable hydroquinone species for use in accordance with the present invention, and that numerous other hydroquinones which are compatible with the remainder of the electrochromic device are likewise contemplated for use.

In a fourth embodiment, the redox buffer may comprise a material represented by formula VI:

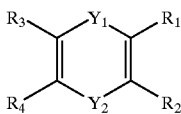

(VI)

wherein $Y_1$–$Y_2$ comprises $O^+$, $N(R_{12})$, or S; and wherein $R_1$–$R_4$ and $R_{12}$ are the same or different and comprise H, a halide, a hydroxy group, a cyano group, a substituted or unsubstituted alkyl, aryl, alkaryl, aralkyl, or alkoxy group containing approximately 1 to approximately 12 carbon atoms, or $CF_3$.

While specific redox buffers have been disclosed, for illustrative purposes only, numerous other redox buffers that would be known to those having ordinary skill in the art having the present disclosure before them are likewise contemplated for use—so long as the redox buffer controllably maintains the predetermined color of the electrochromic medium while in the high transmission state relative to an electrochromic medium without the redox buffer, and is otherwise compatible with the remainder of electrochromic device 100.

Preferably the concentration of the above-identified redox buffers range from approximately 0.01 mM to approximately 10 mM.

In addition, electrochromic medium 124 may comprise other materials, such as light absorbers, light stabilizers, thermal stabilizers, antioxidants, tint providing agents, and mixtures thereof. Suitable UV-stabilizers may include: the material ethyl-2-cyano-3,3-diphenyl acrylate, sold by BASF of Parsippany, N.Y. under the trademark Uvinul N-35 and by Aceto Corp., of Flushing, N.Y. under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybezophenone sold by American Cyanamid under the trademark Cyasorb UV 9; and the material 2-ethyl-2'-ethoxyalanilide sold by Sandoz Color & Chemicals under the trademark Sanduvor VSU—to name a few.

It will be understood that during normal operation, the electrochromic devices of the present invention are intended to be cycled between a high transmission state and a low transmission state numerous times while maintaining a predetermined electrochromic medium color (i.e. colorless, nearly colorless, or intentionally tinted) during the high transmission state relative to an electrochromic medium without the redox buffer.

Electrochromic devices having as a component part a color-stabilized electrochromic medium can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

In support of the present invention, several experiments were conducted wherein electrochromic devices were prepared which comprised one or redox buffer(s), the color-stabilized performance of which were compared to analogous devices fabricated without a redox buffer.

In discussing colors it is useful to refer to the Commission Internationale de l'Eclairage's (CIE) 1976 CIELAB Chromaticity Diagram (commonly referred to the L*a*b* chart). The technology of color is relatively complex, but a fairly comprehensive discussion is given by F. W. Billmeyer and M. Saltzman in Principles of Color Technology, $2^{nd}$ Ed., J. Wiley and Sons Inc. (1981), and the present disclosure, as it relates to color technology and terminology generally follows that discussion. On the L*a*b* chart, L* defines lightness, a* denotes the red/green value and b* denotes the yellow/blue value. Each of the electrochromic media has an absorption spectra at each particular voltage that may be converted into a three number designation, their L*a*b* values. Color change is calculated by importing L*a*b* values into the following formula:

$$\alpha E = SQRT((L_t^* - L_o^*)^2 + (a_t^* - a_o^*)^2 + (b_t^* - b_o^*)^2)$$

wherein

ΔE is the color change;

SQRT is the square root operation;

Subscript "0" is an initial value (for L*,a*, or b*); and

Subscript "t" is a value after a given amount of time (for L*, a*, or b*).

EXPERIMENT NO. 1

In Experiment No. 1, two different electrochromic media (1A and 1B) were prepared by mixing the following materials together in the concentrations provided below:

| Component | Material | Concentration |
|---|---|---|
| Medium 1A | | |
| Cathodic | Octylviologen [$BF_4$]$_2$ | 38.0 mM |
| Anodic | 5,10-Dihydro-5,10-dimethylphenazine | 27.0 mM |
| Redox Buffer | None | — |
| UV-Stabilizer | Tinuvin P | 30.0 mM |
| Thickener | PMMA | 3% by wt. |
| Solvent | Propylene carbonate | — |
| Medium 1B | | |
| Cathodic | Octylviologen [$BF_4$]$_2$ | 38.0 mM |
| Anodic | 5,10-Dihydro-5,10-dimethylphenazine | 27.0 mM |
| Redox Buffer | Triphenylpyrylium $BF_4$ | 1.0 mM |
| UV-Stabilizer | Tinuvin P | 30.0 mM |
| Thickener | PMMA | 3% by wt. |
| Solvent | Propylene carbonate | — |

Media 1A and 1B of Experiment No. 1 were associated with different electrochromic mirrors for testing. Specifically a first substrate was coated with generally clear, conductive fluorine-doped tin oxide, and the second was coated with fluorine-doped tin oxide with a standard silver reflector on rear surface (114B). The substrates were spaced 137 microns apart for accommodating the medium. Each one of the mirrors containing media 1A and 1B was stored in an oven at 85 degrees centigrade to simulate prolonged exposure to a thermally extreme environment. For each of media 1A and 1B, L*a*b* data were collected at predetermined intervals, which were then converted into color change values, the results of which are provided in FIG. 2.

Figure 2:
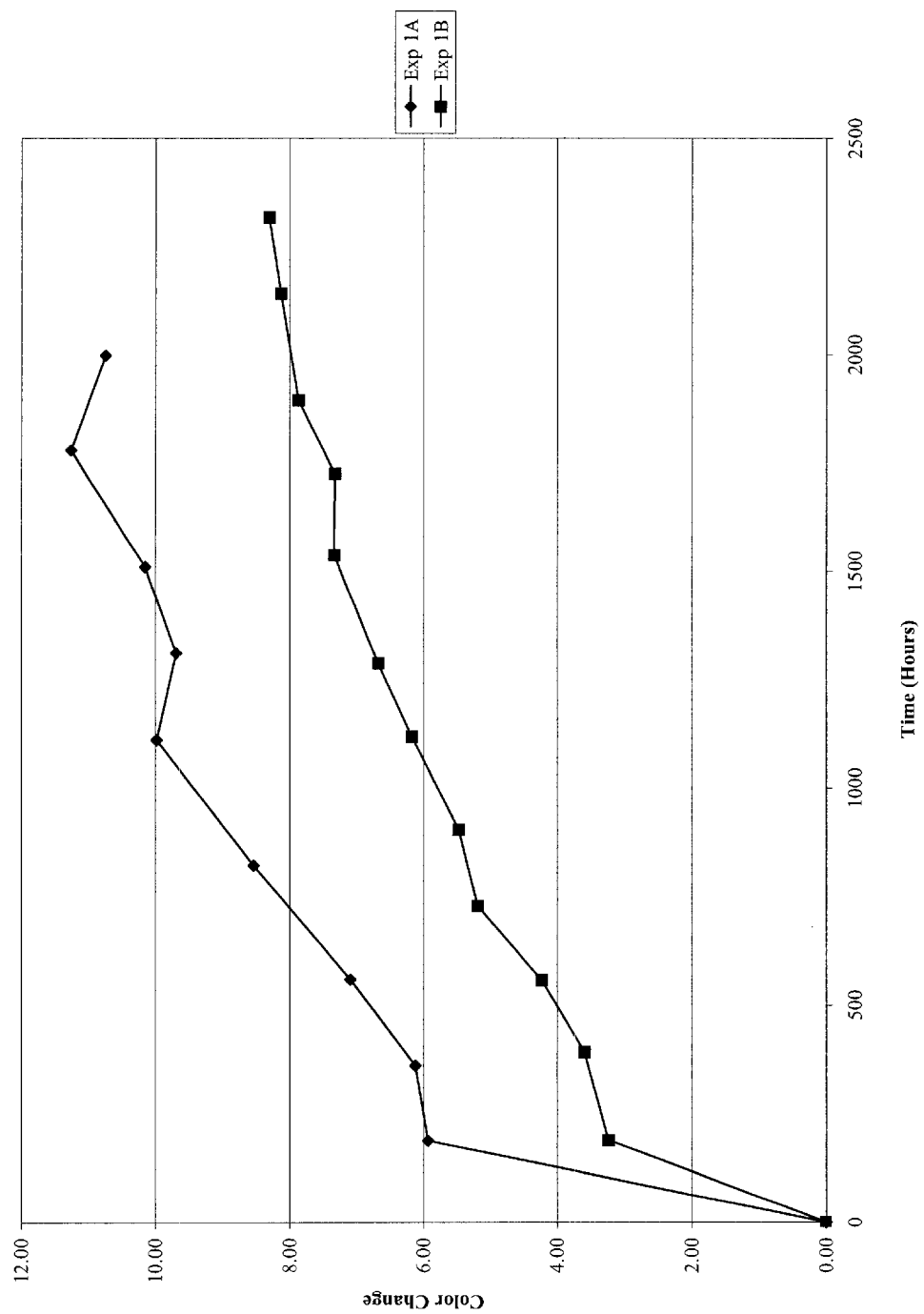
FIG. 2 of the drawings is a two-dimensional plot showing color change as a function of exposure time at 85 degrees centigrade for media 1A and 1B of Experiment No. 1.

As is shown in FIG. 2, the medium with the triphenylpyrylium redox buffer (Medium 1B) is substantially more stable than the medium without such a redox buffer (Medium 1A). In fact, medium 1A experienced a substantial change in color as is evident by its relatively large slope as compared to the relatively flat slope of medium 1B. Therefore, Experiment No. 1 verifies that, indeed, the usage of the above-identified redox buffer provides an effective mechanism to minimize the adverse coloration effects associated with prolonged exposure to thermally extreme environments.

EXPERIMENT NO. 2

In Experiment No. 2, two different electrochromic media (2A and 2B) were prepared by mixing the following materials together in the concentrations provided below:

| Component | Material | Concentration |
| --- | --- | --- |
| Medium 2A | | |
| Cathodic | Octylviologen $[BF_4]_2$ | 38.0 mM |
| Anodic | 5,10-Dihydro-5,10-dimethylphenazine | 27.0 mM |
| Redox Buffer | None | — |
| UV-Stabilizer | Tinuvin P | 30.0 mM |
| Thickener | PMMA | 3% by wt. |
| Solvent | Propylene carbonate | — |
| Medium 2B | | |
| Cathodic | Octylviologen $[BF_4]_2$ | 38.0 mM |
| Anodic | 5,10-Dihydro-5,10-dimethylphenazine | 27.0 mM |
| Redox Buffer | 1,2-Naphthoquinone | 1.0 mM |
| UV-Stabilizer | Tinuvin P | 30.0 mM |
| Thickener | PMMA | 3% by wt. |
| Solvent | Propylene carbonate | — |

Figure 3:
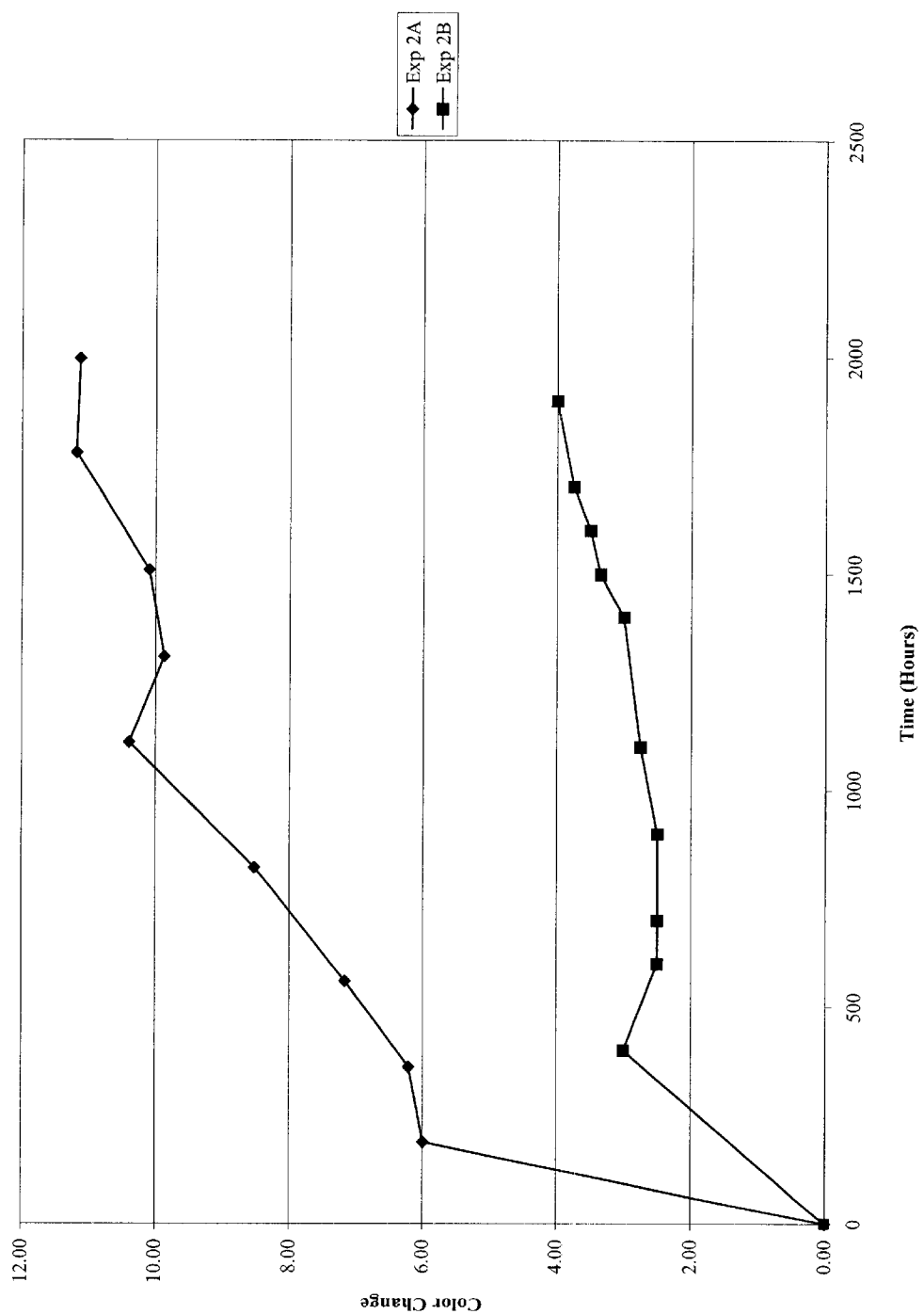
FIG. 3 of the drawings is a two-dimensional plot showing color change as a function of exposure time at 85 degrees centigrade for media 2A and 2B of Experiment No. 2.

Media 2A and 2B of Experiment No. 2 were associated with different electrochromic mirrors for testing. Specifically a first substrate was coated with generally clear, conductive fluorine-doped tin oxide, and the second was coated with fluorine-doped tin oxide with a standard silver reflector on rear surface (114B). The substrates were spaced 137 microns apart for accommodating the medium. Each one of the mirrors containing media 2A and 2B was stored in an oven at 85 degrees centigrade to simulate prolonged exposure to a thermally extreme environment. For each of media 2A and 2B, L*a*b* data were collected at predetermined intervals, which were then converted into color change values, the results of which are provided in FIG. 3. As is shown in FIG. 3, the medium with 1,2-naphthoquinone as the redox buffer (Medium 2B) is substantially more stable than the medium without such a redox buffer (Medium 2A). In fact, medium 2A experienced a substantial change in color as is evident by its relatively large slope as compared to the relatively flat slope of medium 2B. Therefore, Experiment No. 2 verifies that, indeed, the usage of the above-identified redox buffer provides an effective mechanism to minimize the adverse coloration effects associated with prolonged exposure to thermally extreme environments.

EXPERIMENT NO. 3

In Experiment No. 3, two different electrochromic media (3A and 3B) were prepared by mixing the following materials together in the concentrations provided below:

| Component | Material | Concentration |
| --- | --- | --- |
| Medium 3A | | |
| Cathodic | Octylviologen $[BF_4]_2$ | 38.0 mM |
| Anodic | 5,10-Dihydro-5,10-dimethylphenazine | 27.0 mM |
| First Redox Buffer | None | — |
| Second Redox Buffer | None | — |
| UV-Stabilizer | Tinuvin P | 30.0 mM |
| Thickener | PMMA | 3% by wt. |
| Solvent | Propylene carbonate | — |
| Medium 3B | | |
| Cathodic | Octylviologen $[BF_4]_2$ | 38.0 mM |
| Anodic | 5,10-Dihydro-5,10-dimethylphenazine | 27.0 mM |
| First Redox Buffer | 1,2-Naphthoquinone | 0.75 mM |
| Second Redox Buffer | Tetramethylhydroquinone | 0.75 mM |
| UV-Stabilizer | Tinuvin P | 30.0 mM |
| Thickener | PMMA | 3% by wt. |
| Solvent | Propylene carbonate | — |

Figure 4:
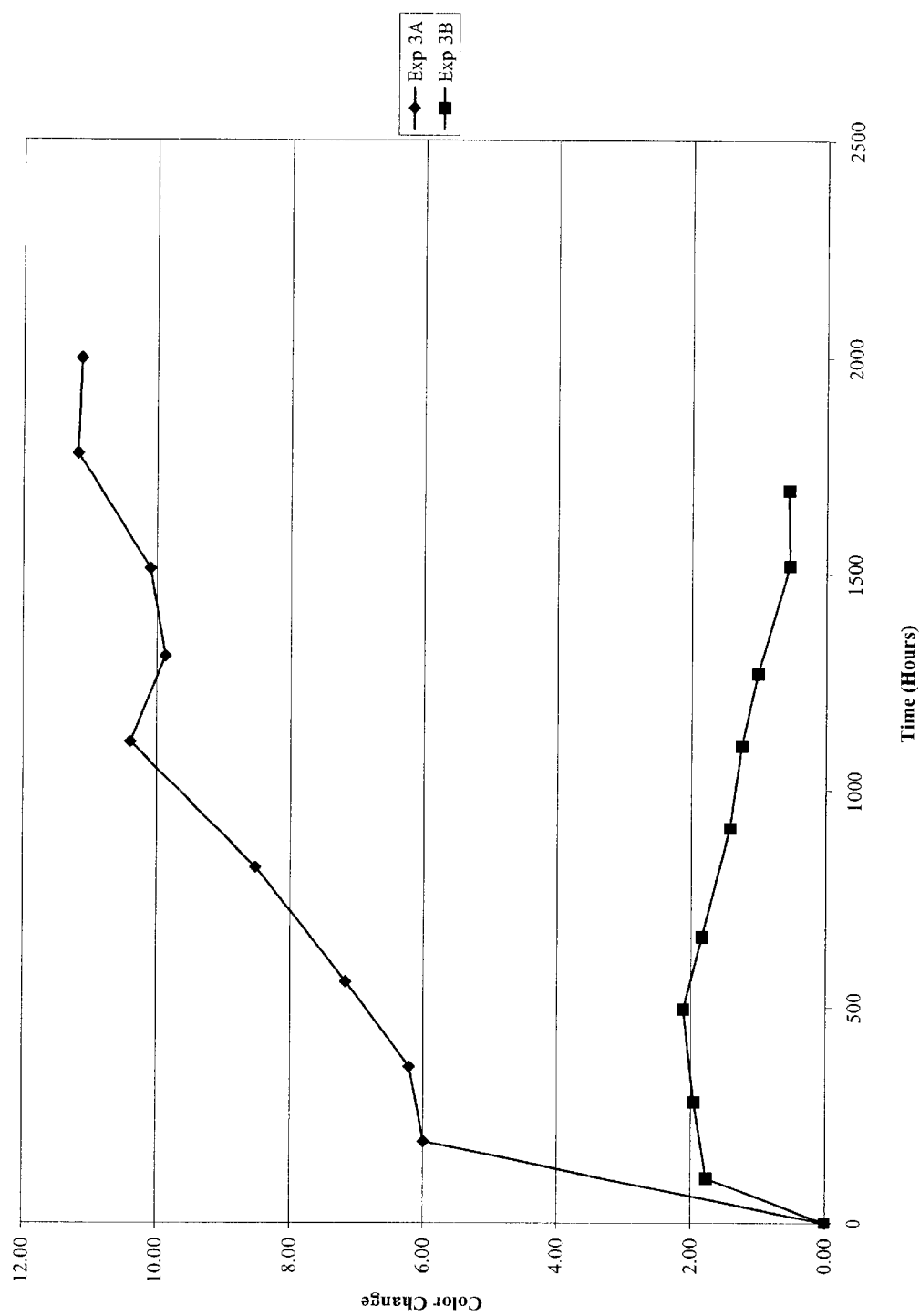
FIG. 4 of the drawings is a two-dimensional plot showing color change as a function of exposure time at 85 degrees centigrade for media 3A and 3B of Experiment No. 3.
Figure 5:
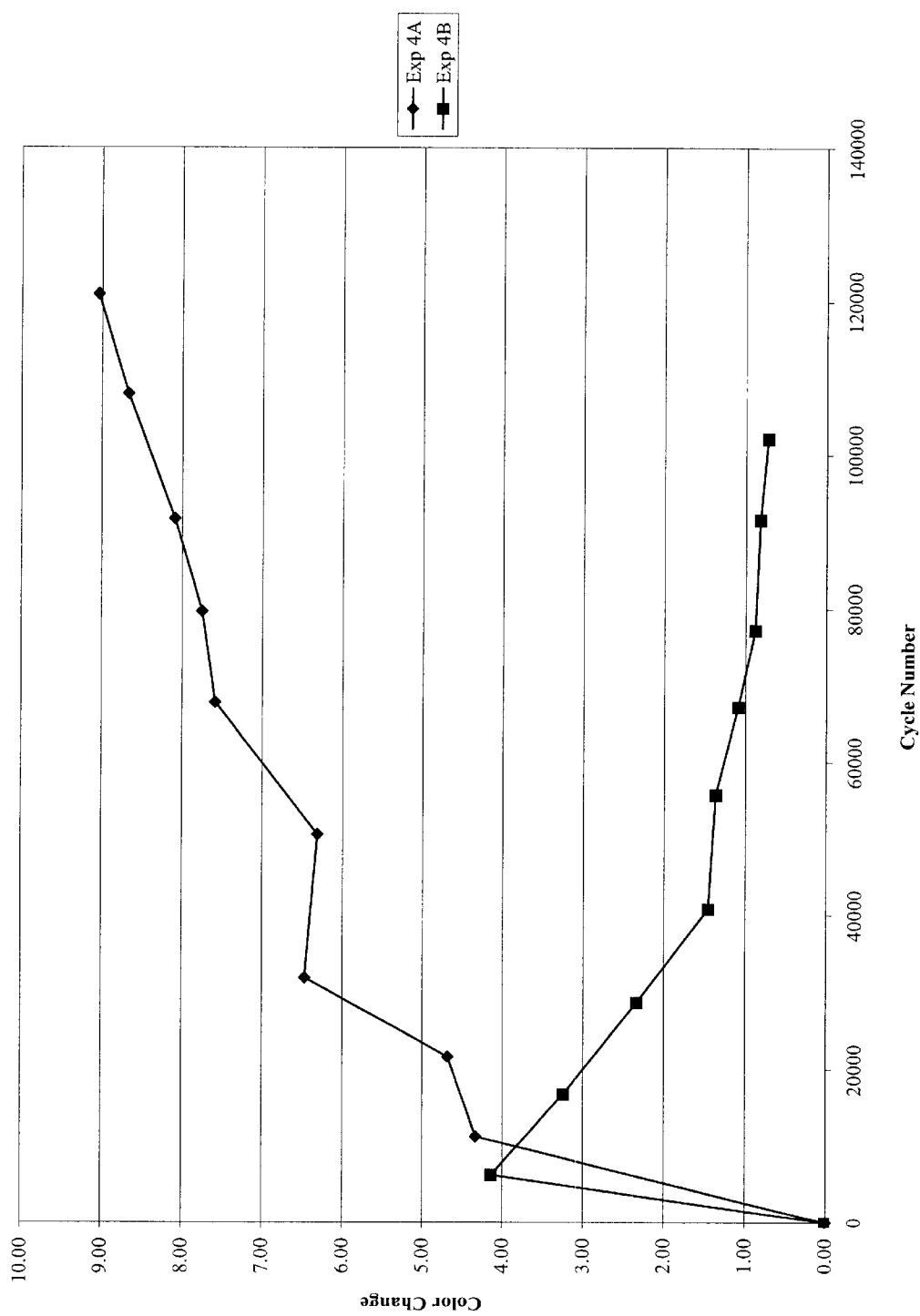
FIG. 5 of the drawings is a two-dimensional plot showing color change as a function of exposure time to cycling at 70 degrees centigrade for media 3A and 3B of Experiment No. 3.

Media 3A and 3B of Experiment No. 3 were associated with two different sets of electrochromic mirrors for testing. Specifically a first substrate was coated with generally clear, conductive fluorine-doped tin oxide, and the second was coated with fluorine-doped tin oxide with a standard silver reflector on rear surface (114B). The substrates were spaced 137 microns apart for accommodating the medium. The first set of mirrors containing media 3A and 3B was stored in an oven at 85 degrees centigrade to simulate prolonged exposure to a thermally extreme environment (FIG. 4). The second set of mirrors containing media 3A and 3B was cycled at 70 degrees centigrade (FIG. 5). For each of the two sets, L*a*b* data were collected at predetermined intervals, which were then converted into color change values, the results of which are provided in FIGS. 4–5. As is shown in FIG. 4, the medium with the redox buffers (Medium 3B) is substantially more stable than the medium without the redox buffers (Medium 3A). In fact, medium 3A experienced a substantial change in color as is evident by its relatively large slope as compared to the relatively flat slope of medium 3B. Similar results can be seen with the mirrors cycled at 70 degrees centigrade in FIG. 5. Therefore, Experiment No. 3 verifies that, indeed, the usage of the above-identified redox buffers provide an effective mechanism to minimize the adverse coloration effects associated with prolonged exposure to thermally extreme environments and/or device cycling.

As can be seen from the above-provided experiments, the incorporation of one or more of the disclosed redox buffers substantially improves the color stability of an electrochromic medium—even under relatively extreme elevated temperatures.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:
1. An electrochromic device, comprising:
   (a) at least one substantially transparent substrate having an electrically conductive material associated therewith; and

(b) an electrochromic medium having a predetermined color while in a high transmission state, wherein the electrochromic medium comprises:
  (1) an anodic material and a cathodic material, wherein both of the anodic and cathodic materials are electroactive and at least one of the anodic and cathodic materials is electrochromic;
  (2) a redox buffer; and
  (3) means associated with the redox buffer for controllably maintaining the predetermined color of the electrochromic medium while in the high transmission state relative to an electrochromic medium without the redox buffer.

2. The electrochromic device according to claim 1, wherein the redox buffer is selected from the group comprising quinone, substituted quinones, and mixtures thereof.

3. The electrochromic device according to claim 1, wherein the redox buffer is selected from the group comprising pyrylium salt, substituted pyrylium salts, bipyrylium salt, substituted bipyrylium salts, and mixtures thereof.

4. The electrochromic device according to claim 1, wherein the redox buffer is selected from the group comprising hydroquinone, substituted hydroquinones, and mixtures thereof.

5. The electrochromic device according to claim 1, wherein the redox buffer is selected from the group comprising quinone, substituted quinones, hydroquinone, substituted hydroquinones, pyrylium salt, substituted pyrylium salts, bipyrylium salt, substituted bipyrylium salts, and mixtures thereof.

6. The electrochromic device according to claim 1, wherein the redox buffer is represented by at least one of the formulae:

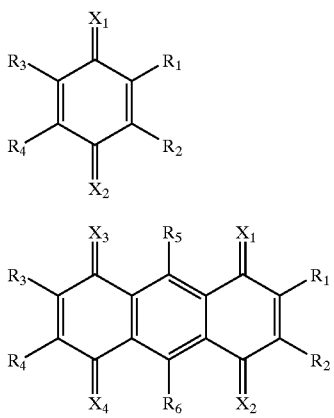

wherein $X_1$–$X_4$ are the same or different and comprise O, $C(CN)_2$, S, $N(R_7)$, or $N^+(R_7)(R_8)$;

wherein $R_1$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; and wherein $R_1$–$R_2$, $R_3$–$R_4$, and/or $R_7$–$R_8$ may be associated with a substituted or unsubstituted benzo group, a closed ring, or form a partially saturated ring.

7. The electrochromic device according to claim 1, wherein the redox buffer is represented by the formula:

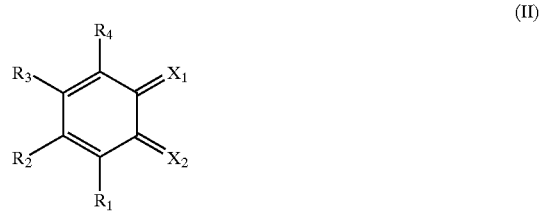

wherein $X_1$–$X_2$ are the same or different and comprise O, $C(CN)_2$, S, $N(R_7)$, or $N^+(R_7)(R_8)$;

wherein $R_1$–$R_4$ and $R_7$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms; and wherein $R_1$–$R_2$, $R_2$–$R_3$, $R_3$–$R_4$, and/or $R_7$–$R_8$ may be associated with a substituted or unsubstituted benzo group, a closed ring, or form a partially saturated ring.

8. The electrochromic device according to claim 1, wherein the redox buffer is represented by the formula:

wherein $Y_1$ comprises $O^+$, $N^+(R_{12})$, or $S^+$;

wherein $R_9$ and $R_{11}$–$R_{12}$ are the same or different and comprise H, a halide, a hydroxy group, a cyano group, a substituted or unsubstituted alkyl, aryl, alkaryl, aralkyl, or alkoxy group containing approximately 1 to approximately 12 carbon atoms, or $CF_3$;

wherein $R_{10}$ comprises H, a halide, a hydroxy group, a cyano group, a substituted or unsubstituted alkyl, aryl, alkaryl, aralkyl, or alkoxy group containing approximately 1 to approximately 12 carbon atoms, $CF_3$, or

wherein $Y_2$ comprises $O^+$, $N^+(R_{12})$, or $S^+$.

9. The electrochromic device according to claim 1, wherein the redox buffer is represented by at least one of the formulae:

(IV-A)

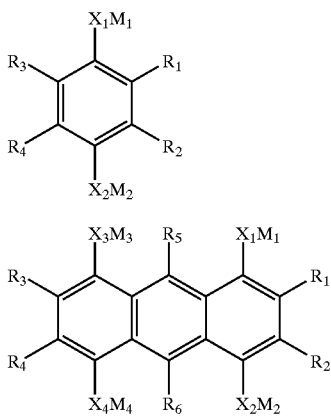

(IV-B)

wherein $X_1$–$X_4$ are the same or different and comprise O, $C(CN)_2$, S, $N(R_7)$, or $N^+(R_7)(R_8)$;

wherein $R_1$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms;

wherein $R_1$–$R_2$, $R_3$–$R_4$, and/or $R_7$–$R_8$ may be associated with a substituted or unsubstituted benzo group, a closed ring, or form a partially saturated ring; and wherein $M_1$–$M_4$ are the same or different and comprise $H^+$, $Li^+$, $Na^+$, $K^+$, $N^+R_4$, $\frac{1}{2}Be^{2+}$, $\frac{1}{2}Mg^{2+}$, $\frac{1}{2}Ca^{2+}$, or $\frac{1}{2}Sr^{2+}$.

10. The electrochromic device according to claim 1, wherein the redox buffer is represented by the formula:

(V)

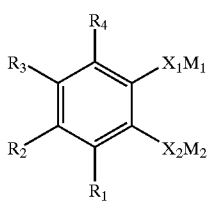

wherein $X_1$–$X_2$ are the same or different and comprise O, $C(CN)_2$, S, $N(R_7)$, or $N^+(R_7)(R_8)$;

wherein $R_1$–$R_4$ and $R_7$–$R_8$ are the same or different and comprise H, a halide, a hydroxy group, a cyano group, or a substituted or unsubstituted alkyl, aryl, alkaryl, aralkyl, or alkoxy group containing approximately 1 to approximately 12 carbon atoms;

wherein $R_1$–$R_2$, $R_2$–$R_3$, $R_3$–$R_4$, and/or $R_7$–$R_8$ may be associated with a substituted or unsubstituted benzo group, a closed ring, or form a partially saturated ring; and wherein $M_1$–$M_2$ are the same or different and comprise $H^+$, $Li^+$, $Na^+$, $K^+$, $N^+R_4$, $\frac{1}{2}Be^{2+}$, $\frac{1}{2}Mg^{2+}$, $\frac{1}{2}Ca^{2+}$, or $\frac{1}{2}Sr^{2+}$.

11. The electrochromic device according to claim 1, wherein the redox buffer is represented by the formula:

(VI)

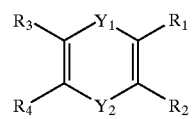

wherein $Y_1$–$Y_2$ comprises $O^+$, $N(R_{12})$, or S; and wherein $R_1$–$R_4$ and $R_{12}$ are the same or different and comprise H, a halide, a hydroxy group, a cyano group, a substituted or unsubstituted alkyl, aryl, alkaryl, aralkyl, or alkoxy group containing approximately 1 to approximately 12 carbon atoms, or $CF_3$.

12. The electrochromic device according to claim 1, wherein the redox buffer is represented by at least one of the formulae:

(1)

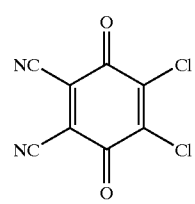

(2)

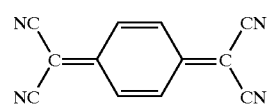

(3)

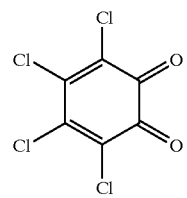

(4)

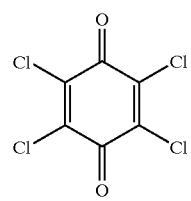

(5)

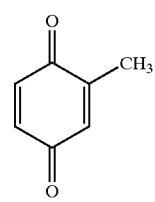

(6)

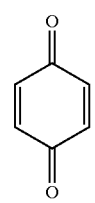

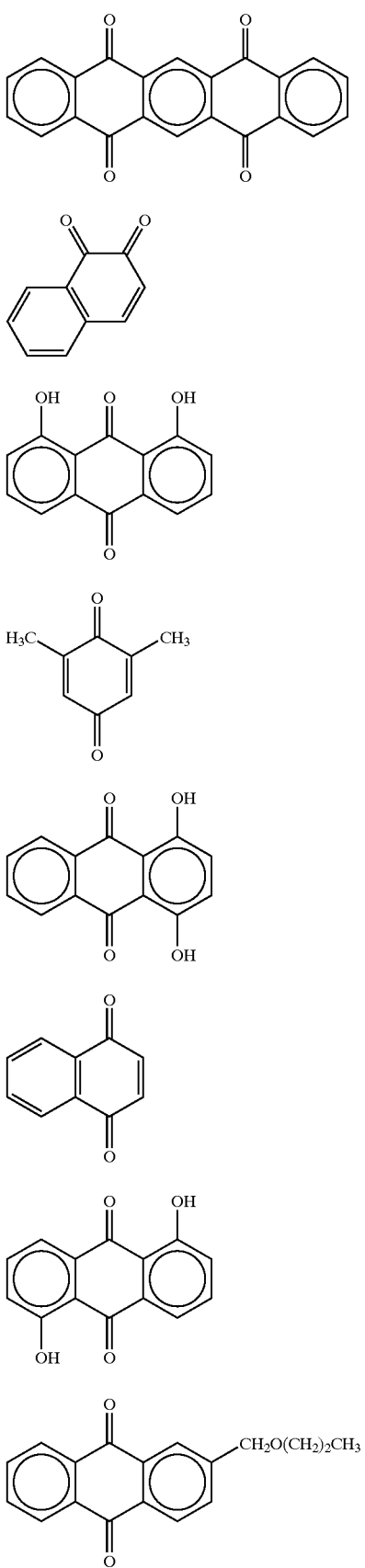
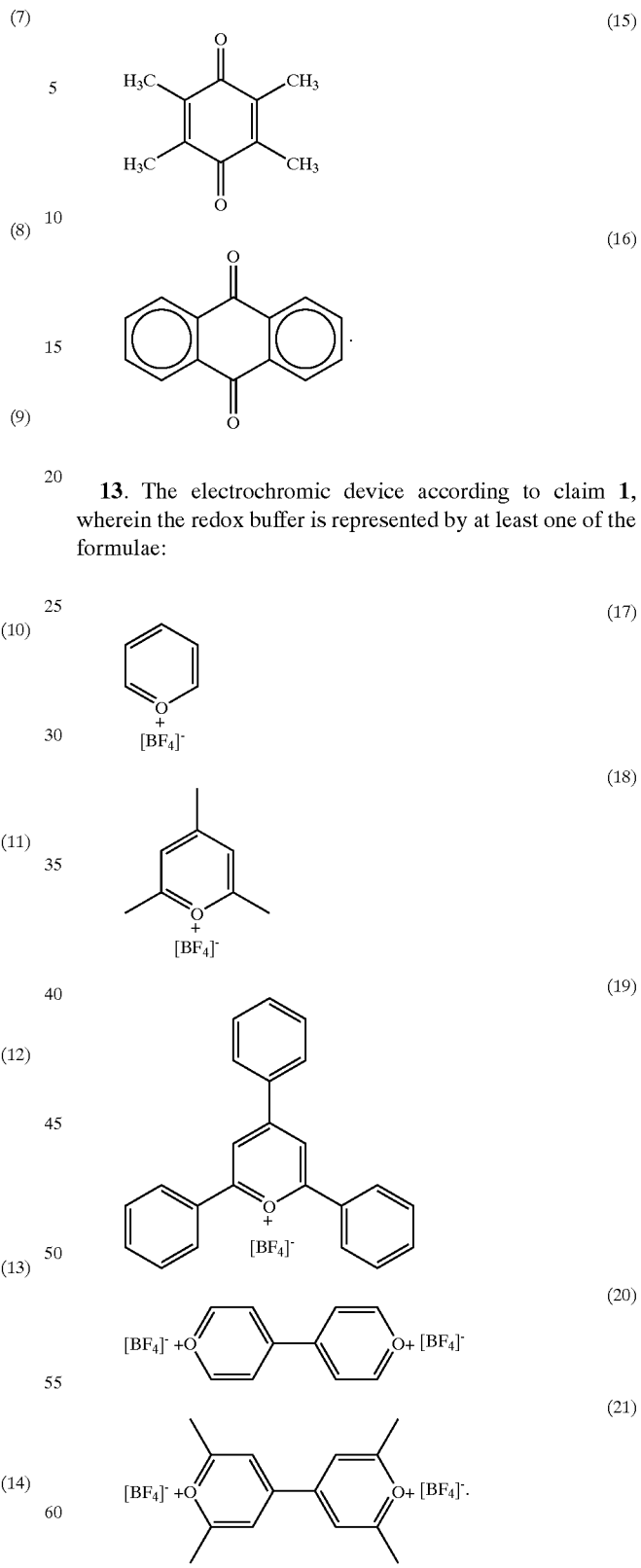
13. The electrochromic device according to claim 1, wherein the redox buffer is represented by at least one of the formulae:
14. The electrochromic device according to claim 1, wherein the redox buffer is represented by at least one of the formulae:

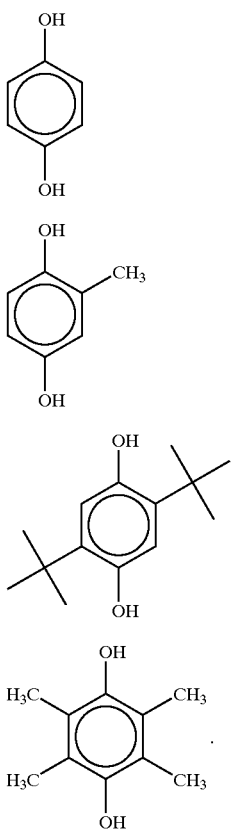

15. The electrochromic device according to claim 1, wherein the predetermined color of the electrochromic medium is selected from the group comprising colorless, nearly colorless, or intentionally colored.

16. The electrochromic device according to claim 1, wherein the redox buffer is coupled to at least one of the anodic material and the cathodic material.

17. The electrochromic device according to claim 1, wherein the concentration of the redox buffer ranges from approximately 0.01 mM to approximately 10 mM.

18. The electrochromic device according to claim 1, wherein the cathodic material comprises a viologen salt.

19. The electrochromic device according to claim 18, wherein the concentration of the cathodic material ranges from approximately 1 mM to approximately 500 mM.

20. The electrochromic device according to claim 19, wherein the concentration of the cathodic material ranges from approximately 5 mM to approximately 50 mM.

21. The electrochromic device according to claim 1, wherein the cathodic material comprises tungsten oxide.

22. The electrochromic device according to claim 1, wherein the anodic material is selected from the group comprising ferrocene, substituted ferrocenes, substituted ferrocenyl salts, substituted phenazines, phenothiazine, substituted phenothiazines, thianthrene, substituted thianthrenes, and mixtures thereof.

23. The electrochromic device according to claim 22, wherein the anodic material is selected from the group comprising di-tert-butyl-diethylferrocene, (6-(tetra-tert-butylferrocenyl)hexyl)triethylammonium tetrafluoroborate, (6-(tetra-tert-butylferrocenyl)-propyl)triethylammonium tetrafluoroborate, 5,10-dihydro-5,10-dimethylphenazine, 3,7,10-trimethylphenothiazine, 2,3,7,8-tetramethoxythianthrene, 10-methylphenothiazine, and mixtures thereof.

24. The electrochromic device according to claim 23, wherein the concentration of the anodic material ranges from approximately 1 mM to approximately 500 mM.

25. The electrochromic device according to claim 24, wherein the concentration of the anodic material ranges from approximately 5 mM to approximately 50 mM.

26. The electrochromic device according to claim 1, further comprising a second substrate.

27. The electrochromic device according to claim 26, wherein the device is an electrochromic window.

28. The electrochromic device according to claim 26, wherein the second substrate is plated with a reflective material.

29. The electrochromic device according to claim 28, wherein the reflective material is selected from the group comprising chromium, rhodium, ruthenium, silver, alloys of the same, and mixtures thereof.

30. The electrochromic device according to claim 29, wherein the device is a vehicular electrochromic mirror.

31. An electrochromic medium having a predetermined color while in a high transmission state, comprising:
    (a) an anodic material and a cathodic material, wherein both of the anodic and cathodic materials are electroactive and at least one of the anodic and cathodic materials is electrochromic;
    (b) a redox buffer; and
    (c) means associated with the redox buffer for controllably maintaining the predetermined color of the electrochromic medium while in the high transmission state relative to an electrochromic medium without the redox buffer.

32. An electrochromic device, comprising:
    (a) at least one substantially transparent substrate having an electrically conductive material associated therewith; and
    (b) an electrochromic medium having a predetermined color while in a high transmission state, wherein the electrochromic medium comprises:
        (1) an anodic material and a cathodic material, wherein both of the anodic and cathodic materials are electroactive and at least one of the anodic and cathodic materials is electrochromic; and
        (2) a redox buffer, wherein the redox buffer controllably maintains the predetermined color of the electrochromic medium while in the high transmission state relative to an electrochromic medium without the redox buffer.

33. An electrochromic medium having a predetermined color while in a high transmission state, comprising:
    (a) an anodic material and a cathodic material, wherein both of the anodic and cathodic materials are electroactive and at least one of the anodic and cathodic materials is electrochromic; and (b) a redox buffer, wherein the redox buffer controllably maintains the predetermined color of the electrochromic medium while in the high transmission state relative to an electrochromic medium without the redox buffer.

34. An electrochromic process comprising the steps of:

(a) providing an electrochromic medium which includes an anodic material and a cathodic material, wherein both of the anodic and cathodic materials are electroactive and at least one of the anodic and cathodic materials is electrochromic, and a redox buffer;

(b) cycling the electrochromic medium between a high transmission state and a low transmission state; and (c) controllably maintaining a predetermined color of the electrochromic medium during said high transmission state relative to an electrochromic medium without the redox buffer.

* * * * *